Aug. 12, 1930.   H. M. ROSEBERG   1,772,915
UNIVERSAL JOINT
Filed Feb. 18, 1929

INVENTOR.
Harry M. Roseberg,
BY Walter N. Haskell,
his ATTORNEY

Patented Aug. 12, 1930

1,772,915

UNITED STATES PATENT OFFICE

HARRY M. ROSEBERG, OF MOLINE, ILLINOIS

UNIVERSAL JOINT

Application filed February 18, 1929. Serial No. 340,999.

My invention has reference to a universal coupling, and has for its chief purpose to provide a flexible connecting means between a pair of shafts in alignment, in which the usual connecting pins or coupling devices will be done away with.

Another object of the invention is to provide a coupling which will be frictionless and noiseless, in which there will be no danger of excessive heating of the operating parts, and which will not require lubrication. The principal parts of the invention can be produced by a relatively cheap stamping operation, and the cost of production is far below that of such devices now in use.

The flexible connection is secured by forming heads of a prescribed type on the ends of the shafts and embracing or enclosing said heads in a body of semi-flexible material, having sufficient resistance to receive the movement of one shaft and impart it to the other, and at the same time be sufficiently flexible to permit the same to yield to any eccentric movement of one of such heads with relation to the other, and return to a normal position therewith.

The particular construction, arrangement, and operation of the invention will more fully appear from the following specification, reference being had to the accompanying drawings, in which:—

Fig. 1 is a medial cross-section of the invention, on the line 1—1 of Fig. 2, with the shafts 9 and 10 in alignment.

Figure 1:
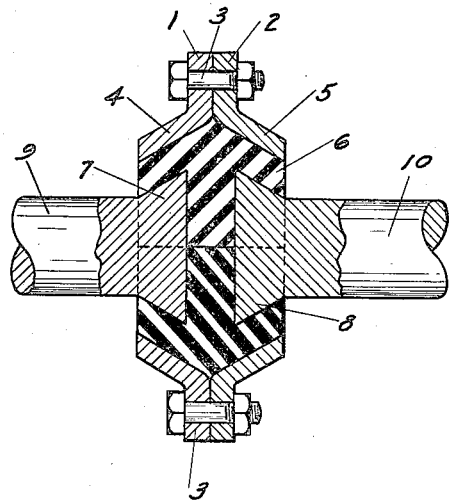

The invention comprises a casing or retainer formed of a pair of circular plates 1 and 2, united by bolts 3, and outwardly converging flanges 4 and 5 forming retaining walls of rectangular form. Within the walls 4 and 5 is a body 6, consisting of a composition of fabric and rubber, in approximately the proportions of eighty per cent of the fabric to twenty per cent of the rubber. The faces of the body 6 are flush with the edges of the retaining walls, and in the opposite sides of said body are recesses to receive the rectangular heads 7 and 8 of shafts 9 and 10, shown in substantial alignment in Fig. 1 of the drawings. The sides of the heads 7 and 8 slope outwardly to conform with the incline of the walls 4 and 5, and said walls are also in parallel relation with said heads.

Figure 3:
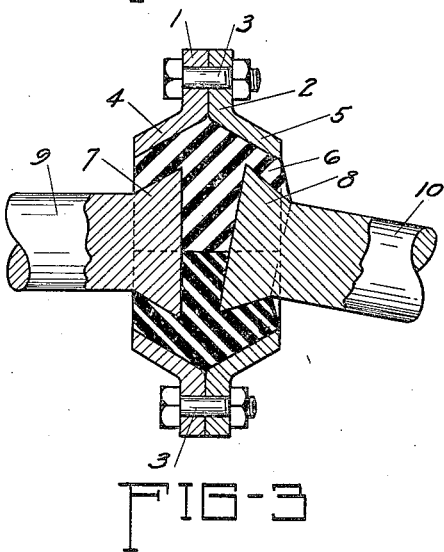
Fig. 3 is a view similar to Fig. 1, with the shaft 10 out of alignment.

The body 6 possesses a high degree of tension or resistance qualities, and any change in the alignment of one of the shafts, such as is shown in Fig. 3, results in an approach of one side of the head of the shaft to the inclined wall nearest thereto. This causes a compression of that part of the body 6 between the head and wall, the compressed part at once resuming its former shape upon the shafts straightening out. That portion of the body 6 between the heads 7 and 8 serves as a cushion, which also conforms to any changes in the relative positions of the heads. In any position occupied by the shafts there is a close contact between the heads thereon and the body 6, causing a constant communication of the rotary movement of one of said shafts to the other.

Figure 2:
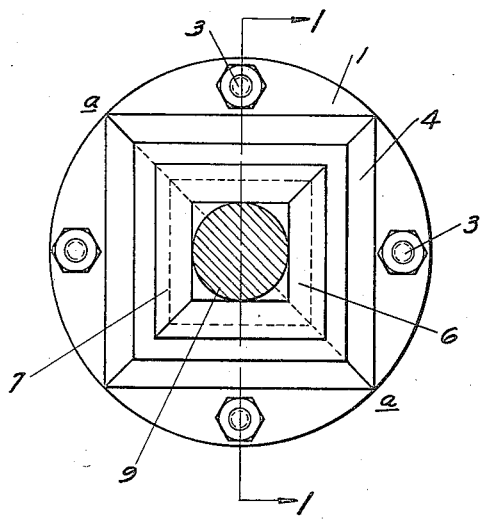
Fig. 2 is a side view thereof.

For convenience in construction the body 6 is formed in two parts, with diagonal engaging faces along the line a a of Fig. 2. Each of said parts also contains one half of the recesses for the heads 7 and 8. To assemble the parts of the invention the plates 1 and 2 are first separated, and strung upon the shafts 9 and 10, in the positions they naturally occupy. The heads 7 and 8 are then enclosed within the head 6, and the plates 1 and 2 brought together with the body 6 in position therein, and the plates bolted to each other. The device is then ready for the operation hereinbefore set forth.

The composition of which the body 6 is formed is of a commercial type, and is produced by grinding up quantities of fabric, such as old automobile tires, and quantities of rubber, and mixing them in the desired proportions. The compound is then subjected to a steaming process, known as "curing", and the product can be given the desired shape in molds. The proportions of fabric and rubber determine the degree of elasticity of the compound.

As before mentioned, there are no metallic parts bearing against other metals, no noise or overheating, and no need for lubrication.

Changes can be made in the form and arrangement of the invention without departing from the spirit thereof.

What I claim, and desire to secure by Letters Patent, is:

1. A device of the class described, comprising a pair of coupling plates, each provided with outwardly converging retainer walls, means for detachably uniting said plates, a filler in said retaining walls formed of a fabric-rubber composition of semi-rigid character, and a pair of shafts provided with heads enclosed in said filler and rotatable therewith.

2. A device of the class described, comprising a pair of coupling plates and connecting means therefor, outwardly converging retainer walls of rectangular formation, a semi-rigid elastic body portion held by said retainer walls, and provided in its opposite faces with rectangular recesses the faces of which are in parallel relation with said retaining walls, and a pair of oppositely disposed shafts provided with heads conforming to the shape of said recesses and held therein, said body portion forming an elastic cushion between the faces of said heads and said retainer walls, and also between the end faces of said heads.

In testimony whereof I affix my signature.

HARRY M. ROSEBERG.